(12) United States Patent
Shum et al.

(10) Patent No.: US 10,601,237 B1
(45) Date of Patent: Mar. 24, 2020

(54) CHARGER APPARATUS FOR MOBILE DEVICES

(71) Applicant: Chargerito, LLC, San Francisco, CA (US)

(72) Inventors: Allegra Shum, San Francisco, CA (US); Alexander Andon, San Francisco, CA (US); Dan Soha, San Francisco, CA (US)

(73) Assignee: Cargerito, LLC, San Francisco, CA (US)

( * ) Notice: Subject to any disclaimer, the term of this patent is extended or adjusted under 35 U.S.C. 154(b) by 7 days.

(21) Appl. No.: 15/870,032

(22) Filed: Jan. 12, 2018

(51) Int. Cl.
   *H02J 7/00* (2006.01)
   *H01R 33/94* (2006.01)
   *H02J 7/02* (2016.01)

(52) U.S. Cl.
   CPC ............ *H02J 7/0042* (2013.01); *H01R 33/94* (2013.01); *H02J 7/022* (2013.01)

(58) Field of Classification Search
   CPC .................................................. H02J 7/0042
   USPC ........................................................ 320/111
   See application file for complete search history.

(56) References Cited

U.S. PATENT DOCUMENTS

| | | | |
|---|---|---|---|
| D693,764 S | 11/2013 | Hok Man | |
| D742,309 S | 11/2015 | Sumida | |
| 9,236,699 B2 | 1/2016 | Lai | |
| 9,434,319 B2* | 9/2016 | Oldani | B60R 11/02 |
| D780,725 S | 3/2017 | Kim et al. | |
| D798,233 S | 9/2017 | Huang et al. | |
| D799,422 S | 10/2017 | Chen | |
| D804,412 S | 12/2017 | Huang et al. | |
| 2010/0117598 A1* | 5/2010 | Lin | H02J 7/0044 320/115 |
| 2013/0241489 A1* | 9/2013 | Ting | H02J 7/0044 320/111 |
| 2015/0015204 A1* | 1/2015 | Sorias | H02J 7/0044 320/111 |
| 2015/0280479 A1* | 10/2015 | Levy | H02J 7/0055 320/111 |

* cited by examiner

*Primary Examiner* — Jerry D Robbins
(74) *Attorney, Agent, or Firm* — Bush Intellectual Property Law; Kenneth M. Bush (57) ABSTRACT

A charger apparatus having an arm hingedly connected to a charger body and positionable between a stowed arm position and a deployed arm position to support in the deployed arm position a mobile device engaged with the charger apparatus. The charger apparatus includes a connector housing pivotally connected with the charger body and having a connector mechanically engageable with the mobile device for electrical communication with the mobile device disposed upon the connector housing. The connector housing cooperates mechanically with the arm to allow the connector housing to be positioned from a stowed position into a deployed position only when the arm is positioned in the deployed arm position, and to allow the arm to be positioned from the deployed arm position into the stowed arm position only when the connector housing is positioned in the stowed position.

10 Claims, 5 Drawing Sheets

FIG. 5B

CHARGER APPARATUS FOR MOBILE DEVICES

BACKGROUND OF THE INVENTION

Field

The present disclosure relates to the charging of mobile devices, and, more particularly, to chargers for the charging of mobile devices.

Background

There is an increasing use of a variety of mobile devices, including smart phones, smart watches, wearables, and tablets. Such mobile devices all run on battery power and must be frequently charged so they can continue to be used. Various sources of power may be used to charge the mobile device. For example, an external portable battery of usually greater capacity than that of the mobile device may be used to charge the mobile device. Another lower power device, such a computer or low power outlet, may be user to charge the mobile device, and the mobile device may connect to the low power device by, for example, a USB cord.

An AC source of AC power at standard voltage and frequency (e.g., 120 v at 60 hz or 220 v at 50 hz) may be used to charge the mobile device. However, such standard AC power must be converted into electrical power usable by the mobile device, which is usually direct current (DC) at low voltage (e.g., 5 v at 1A for standard USB). While various charging devices currently exist that convert standard AC power into electrical power usable by the mobile device, existing charging devices may be cumbersome to transport and difficult to deploy. For example, existing charging devices may be inconveniently sized being thus cumbersome to transport in a pocket, briefcase, or purse. Cords that usually form part of the charging device may become tangled or lost making deployment difficult or impossible. Cords may need to be connected to the charging device during deployment adding further inconvenience.

Accordingly, there is a need for improved apparatus as well as related methods that charge mobile devices.

BRIEF SUMMARY OF THE INVENTION

These and other needs and disadvantages may be overcome by the charger apparatus disclosed herein. Additional improvements and advantages may be recognized by those of ordinary skill in the art upon study of the present disclosure.

In various aspects, the charger apparatus disclosed herein includes an arm hingedly connected to a charger body and positionable between a stowed arm position and a deployed arm position to support, when in the deployed arm position, at least in part, a mobile device engaged with said charger apparatus. The arm may support the mobile device in a near upright position. The charger apparatus includes a connector housing pivotally connected with the charger body and having a connector mechanically engageable with the mobile device for electrical communication with the mobile device disposed upon the connector housing, in various aspects. The connector housing is positionable between a stowed position in which the connector cannot engage the mobile device and a deployed position in which the connector can engage the mobile device, in various aspects. The connector housing cooperates mechanically with the arm to allow the connector housing to be positioned from the stowed position into the deployed position only when the arm is positioned in the deployed arm position, and to allow the arm to be positioned from the deployed arm position into the stowed arm position only when the connector housing is positioned in the stowed position, in various aspects.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

A charger apparatus for charging mobile devices is disclosed herein. The charger apparatus includes a charger body with prongs pivotally engaged with the charger body that may be inserted into a socket and a connector pivotally engaged with the charger body to communicate electrical power from the charger body to a mobile device, in various aspects. An arm is hingedly connected to the charger body, and the arm supports the mobile device in an almost upright position when the mobile device is engaged with the connector, in various aspects. The connector may be any of a variety of types, depending on the mobile device. The charger body includes a rectifier having various electrical components that convert AC power provided at the socket into DC power at the connector suitable for delivery to the mobile device. The arm mechanically cooperates with the connector so that the connector cannot engage the mobile device unless the arm is deployed in a deployed arm position that supports the mobile device, in various aspects. The arm, the connector, and the prongs may be positioned between deployed positions for use of the charger apparatus and stowed positions for storage or transport of the charger apparatus. With the arm, connector, and prongs in stowed positions, the size of the charger apparatus is minimized to enhance storage or portability of the charger apparatus.

Figure 1A:
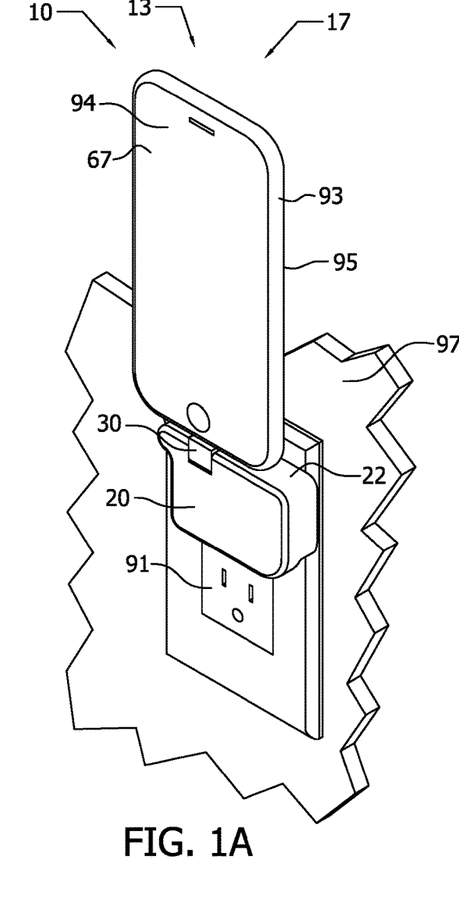
FIG. 1A illustrates by frontal perspective view an exemplary implementation of a charger apparatus according to the present inventions.
Figure 1B:
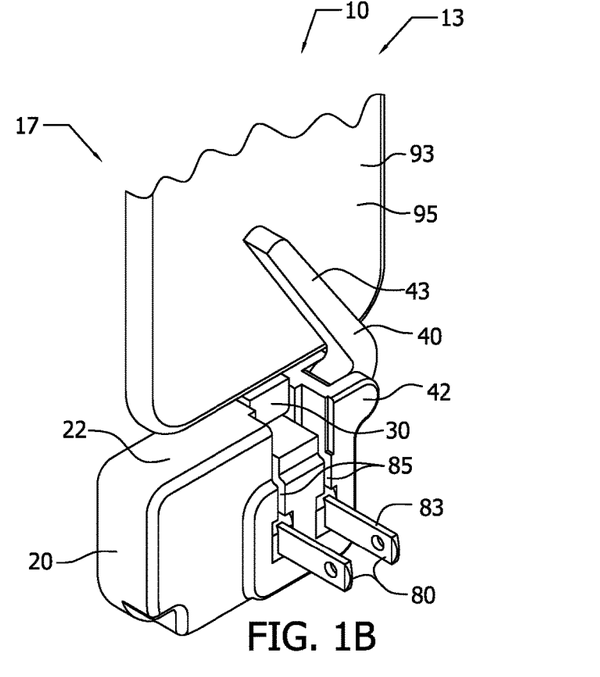
FIG. 1B illustrates by rear perspective view portions of the exemplary implementation of the charger apparatus of FIG. 1A.
Figure 1C:
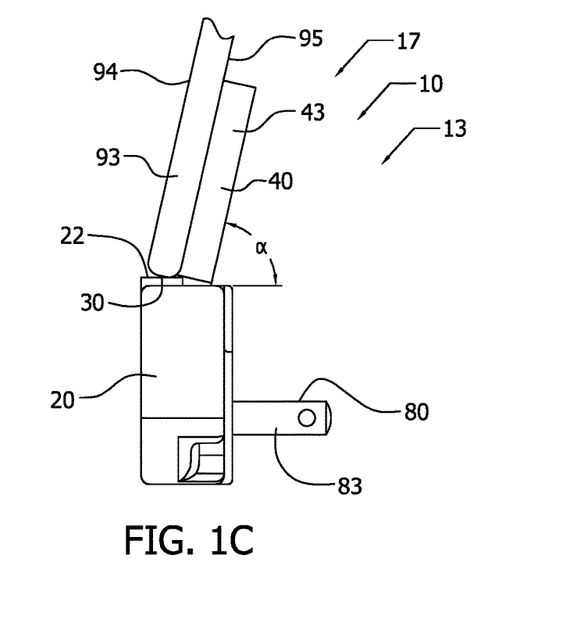
FIG. 1C illustrates by side view portions of the exemplary implementation of the charger apparatus of FIG. 1A.

FIGS. 1A, 1B, 1C illustrate exemplary charger apparatus 10 including charger body 20 in deployed charger position 13. As illustrated in FIG. 1A, charger body 20 is received operatively in socket 91 so that charger body 20 is in electrical communication with socket 91 that, for example, supplies mains electric power. Mobile device 93 is engaged with charger body 20 by connector 32 of connector housing 30 (see FIG. 2B) to be in electrical communication through connector 32 with rectifier 26 within cavity 24 of charger body 20 (see FIG. 4), and, thence, with socket 91 in order that mobile device 93 may receive electrical power from socket 91. Mobile device 93 is supported by charger body 20, and side 94 of mobile device 93, which includes screen 67, is visible in the illustration of FIG. 1A. Mobile device 93 may include, for example, a smart phone, smart watch, wearable, and tablet. Socket 91 may be located about wall 97 that includes a wall as well as other generally vertical surface, as illustrated in FIG. 1A. In various other implementations, socket 91 may be located on a generally horizontal surface or surface having various other orientations.

As illustrated in FIG. 1B, arm 40, which is hingedly engaged with charger body 20 by hinge 42, is positioned in deployed arm position 43 to bias against side 95 of mobile device 93 in order to support mobile device 93 in a near upright position 17 when charger body 20 is received in socket 91. Side 95 of mobile device 93 leans against arm 40 in near upright position 17. Prongs 80, which are pivotally engaged with charger body 20, are in deployed prong position 83, as illustrated, for insertable removable engagement with socket 91. Note that, in certain implementations, mobile device 93 may be in reversed orientation with respect to arm 40 and charger body 20, so that arm 40 is biased against side 94 of mobile device 93.

As illustrated in FIG. 1C, mobile device 93 rests gravitationally, at least in part, upon side 22 of charger body 20 while engaged with connector 32. In other implementations, mobile device 93 may be supported only by connector 32 or by connector 32 in combination with connector housing 30. Arm 40 supports supports side 95 of mobile device 93 to prevent mobile device 93 from becoming detached from connector 32, falling from charger apparatus 10 while engaged with connector 32, or from damaging connector 32, for example, by exerting a moment on connector 32 by being in cantilevered engagement with connector 32. Mobile device 93 is supported by arm 40 in near upright position 17 at angle a with respect to the horizontal where, for example, α may be generally within the range of 75°<α<90° so that mobile device 93 is slightly canted when biased against arm 40 in near upright position 17 and with charger body 20 engaged with vertical wall 97, as illustrated. Charger body 20, connector housing 30, and arm 40 may be formed of various hard plastics, in various implementations. Various electrical pathways may be disposed internally of connector housing 30 that communicate with connector 32 and that communicate with rectifier 26 or controller 28 that are disposed within cavity 24 of charger body 20 (see FIG. 4). Arm 40 may support mobile device 93 in implementations in which socket 91 is disposed about a horizontal surface so that side 95 lies generally in a horizontal plane in biased engagement against arm 40 that also extends generally in the horizontal plane.

Figure 2A:
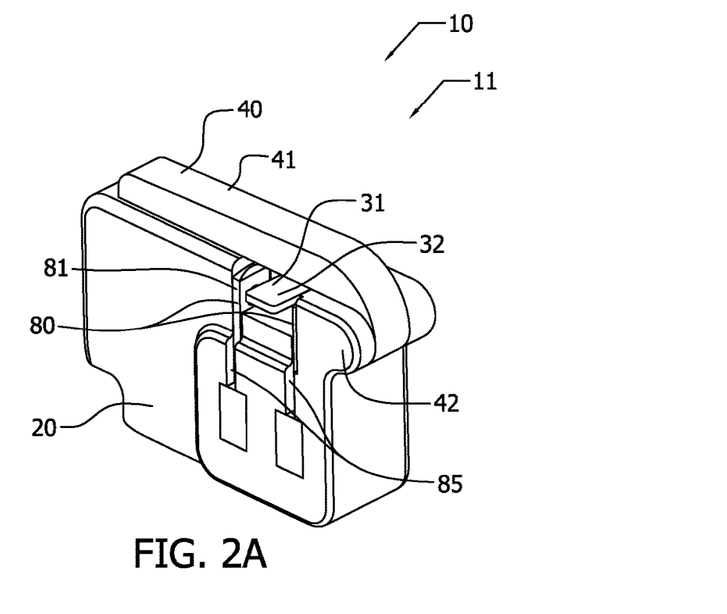
FIG. 2A illustrates by perspective view the exemplary implementation of the charger apparatus of FIG. 1A in a stowed charger position.
Figure 2B:
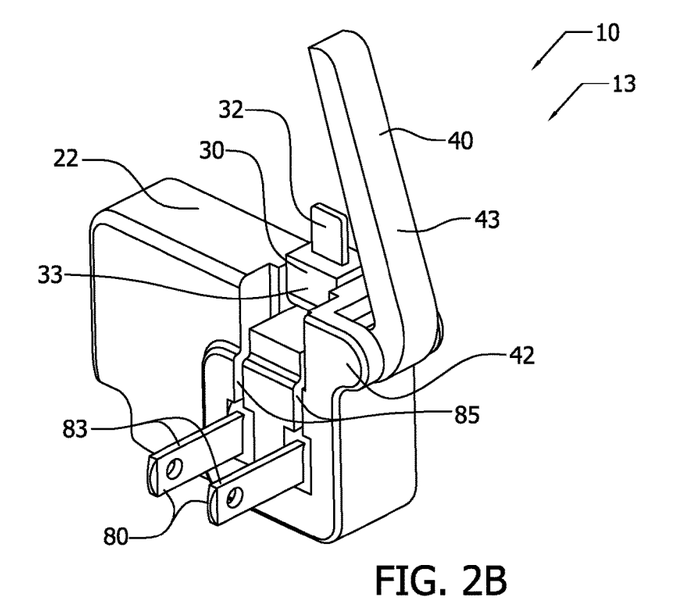
FIG. 2B illustrates by perspective view the exemplary implementation of the charger apparatus of FIG. 1A in a deployed charger position.

FIG. 2A illustrates charger apparatus 10 in stowed charger position 11 with connector housing 30 in stowed position 31, arm 40 in stowed arm position 41, and prongs 80 in stowed prong position 81. As illustrated, arm 40 in stowed arm position 41 is generally biased against portions of charger body 20 to conceal at least portions of connector housing 30. Prongs 80 in stowed prong position 81 are received within slots 85 formed in charger body 20, as illustrated. Various accesses such as indentations, slots, grippable surfaces, and so forth may be formed, for example, about charger body 20 that allow the user to grasp prongs 80 in stowed prong position 81 in order to pivot prongs 80 from stowed prong position 81 into deployed prong position 83, as illustrated in FIG. 2B. With charger apparatus 10 in stowed charger position 11, charger apparatus 10 is minimized for the convenience of carrying charger apparatus 10 about, for example, in a pocket, handbag, or briefcase of a user.

FIG. 2B illustrates charger apparatus 10 in deployed charger position 13 with connector housing 30 in deployed position 33, arm 40 in deployed arm position 43, and prongs 80 in deployed prong position 83. Prongs 80 in deployed prong position 83 may be insertably removably received in socket 91. Thus, charger apparatus 10 in deployed charger position 13 may be insertably removably received in socket 91 and may be removably engaged with mobile device 93 via connector 32 to charge mobile device 93.

Connector 32 of connector housing 30 engages with a corresponding connection point (not shown) of mobile device 93 to communicate power onto mobile device 93. Connector 32 may be, for example, a Lightning connector (Apple, Inc.), micro-USB connector, USB connector, HDMI connector, or other connector, as would be readily recognized by those of ordinary skill in the art upon study of this disclosure. Connector housing 30 is pivotally engaged with charger body 20 to rotate between deployed position 33 of FIG. 2B, in which connector 32 is oriented generally perpendicular to side 22 of charger body 20 for engagement with mobile device 93, and stowed position 31 of FIG. 2A, in which connector housing 30 including connector 32 is rotated substantially 90° from deployed position 33 with connecter oriented generally parallel to side 22 of charger body 20. Connector 32 may be slightly non-vertical in deployed position 33 to allow the mobile device 93 to be supported by arm 40 at angle α with respect to the horizontal while engaged with connector 32, as illustrated in FIG. 1C.

FIGS. 3A-3E illustrate the positioning of arm 40 between stowed arm position 41 and deployed arm position 43 and the positioning of connector housing 30 between stowed position 31 and deployed position 33. As illustrated in FIGS. 3A-3D, connector housing 30 is attached to shaft 34, and shaft 34 is rotatably engaged with charger body 20 to allow shaft 34 and connector housing 30 attached thereto to pivot between stowed position 31 and deployed position 33. Shaft 34 cooperates mechanically with end 45 of arm 40 to allow arm 40 to be positioned in stowed arm position 41 only when connector housing 30 is positioned in stowed position 31, and to allow connector housing 30 to be positioned in deployed position 33 only when arm 40 is positioned in deployed arm position 43.

Figure 3A:
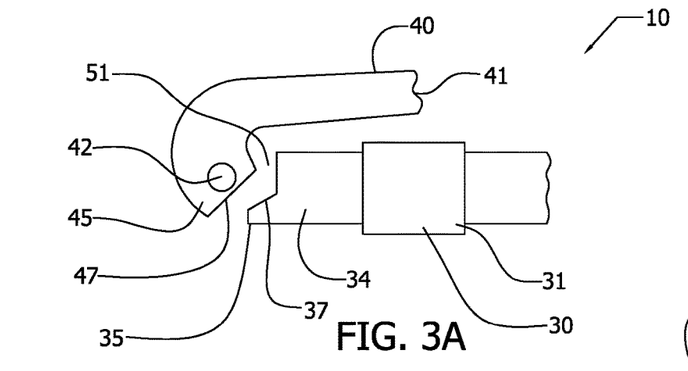
FIG. 3A illustrates by frontal cut-away view portions of the charger apparatus of FIG. 1A including a connector housing in a stowed position and an arm in a stowed arm position.

As illustrated in FIG. 3A, connector housing 30 is in stowed position 31 and arm 40 is in stowed arm position 41. Shaft end 35 of shaft 34 includes notch 51 that includes face 37, in this implementation. With connector housing 30 in stowed position 31, notch 51 including face 37 is oriented so that arm face 47 at arm end 45 of arm 40 may intrude into notch 51 when arm 40 is positioned in stowed arm position 41, as illustrated. Arm face 47 lies generally parallel to face 37 and arm face 47 may be either in biased engagement with face 37 or offset from face 37 but still within notch 51 when arm 40 is in stowed arm position 41, as illustrated in FIG. 3A. Arm face 47 is positioned with respect to face 37 to lock shaft 34 from rotation, and, thus, prevent connector housing 30 from being positioned from stowed position 31 into deployed position 33 by rotation of shaft 34 when arm 40 is in stowed arm position 41, as illustrated in FIG. 3A. In addition, when arm 40 is in stowed arm position 41, arm 40 is positioned over connector housing 30 and connector 32 to further prevent connector housing 30 from being positioned from stowed position 31 into deployed position 33 (see also FIG. 2A).

Figure 3B:
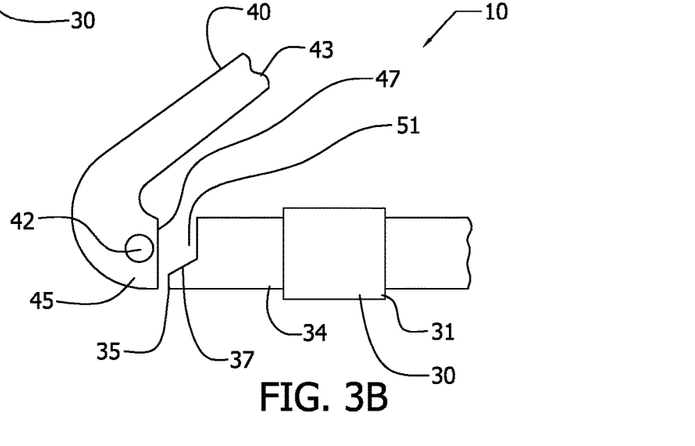
FIG. 3B illustrates by frontal cut-away view portions of the charger apparatus of FIG. 1A including the connector housing in the stowed position and the arm in a deployed arm position.

As illustrated in FIG. 3B, connector housing 30 is in stowed position 31 and arm 40 is in deployed arm position 43. In this implementation, when connector housing 30 is in stowed position 31, arm 40 may be positioned between stowed arm position 41 and deployed arm position 43 as correspondingly arm face 47 is positioned in notch 51, as illustrated in FIG. 3A, or withdrawn from notch 51, as illustrated in FIG. 3B, because shaft end 35 of shaft 34 does not interfere with the positioning of arm 40 when connector housing 30 is in stowed position 31.

Figure 3C:
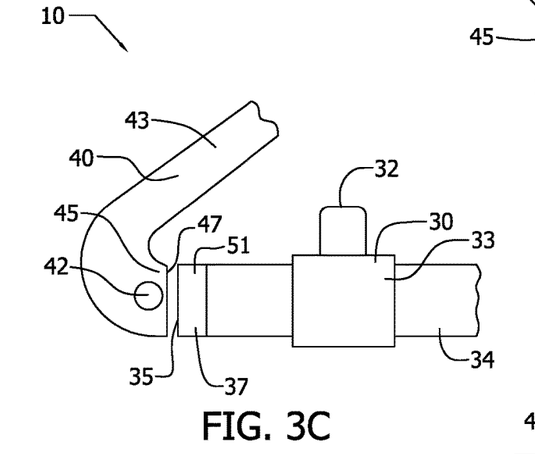
FIG. 3C illustrates by frontal cut-away view portions of the charger apparatus of FIG. 1A including the connector housing in a deployed position and the arm in deployed arm position.
Figure 3D:
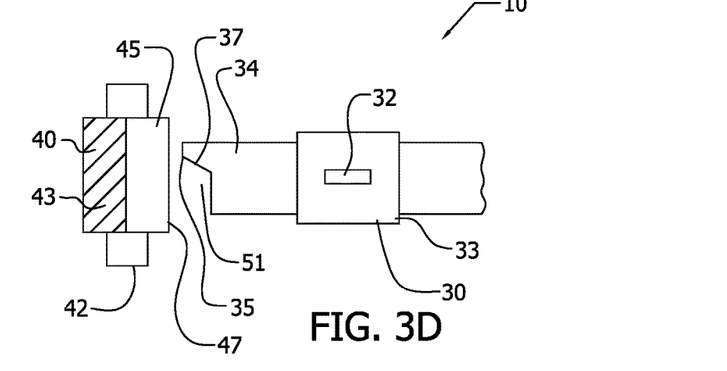
FIG. 3D illustrates by top cut-away view portions of the charger apparatus of FIG. 1A including the connector housing in the deployed position and the arm in the deployed arm position.
Figure 3E:
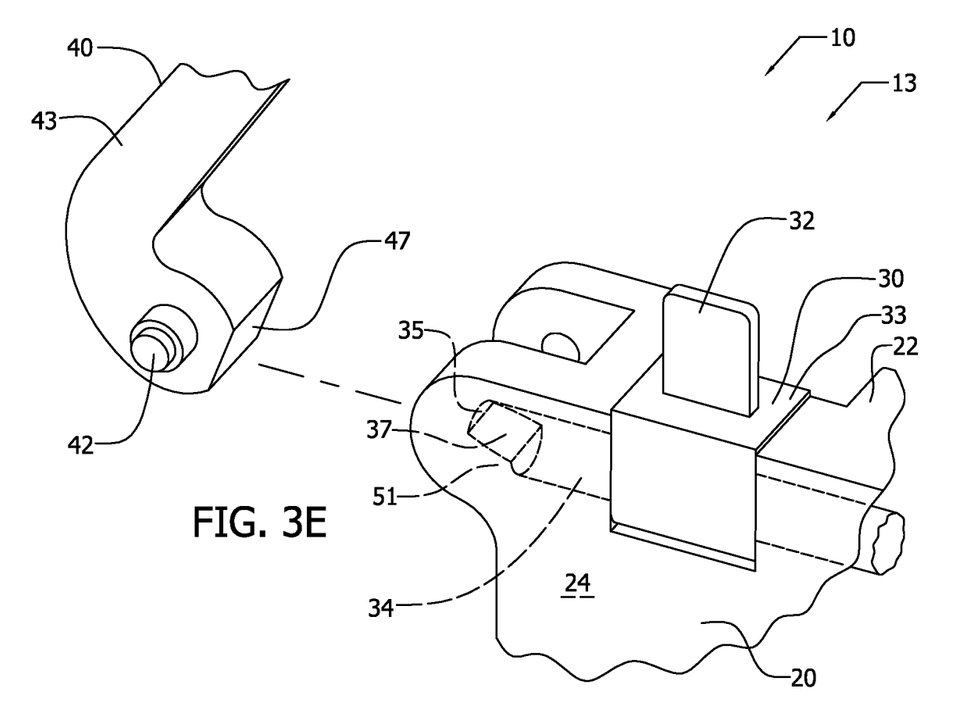
FIG. 3E illustrates by partially exploded perspective view portions of the charger apparatus of FIG. 1A including the connector housing in the deployed position and the arm in the deployed arm position.

When arm 40 is positioned in deployed arm position 43, arm face 47 lies outside notch 51 so that face 37 is disengaged from arm face 47 of arm 40 thereby allowing rotation of shaft 34 and corresponding positioning of connector housing 30 between stowed position 31, as illustrated in FIG. 3B, and deployed position 33, as illustrated in FIGS. 3C, 3D, 3E.

As illustrated in FIGS. 3C, 3D, 3E, connector housing 30 is in deployed position 33 and arm 40 is in deployed arm position 43. When connector housing 30 is in deployed position 33, arm 40 is locked into deployed arm position 43 by shaft end 35 of shaft 34, as illustrated, that is positioned adjacent to arm face 47. Notch 51 of shaft 34 is oriented so that notch 51 cannot accommodate arm face 47 when connector housing 30 is in deployed position 33. Shaft end 35, which is adjacent to arm face 47, prevents rotation of arm 40 about hinge 42. Thus, arm 40 cannot be positioned from deployed arm position 43 into stowed arm position 41 when connector housing 30 is in deployed position 33 and shaft 34 is rotated into the position illustrated in FIGS. 3C, 3D, 3E. FIG. 3E further illustrates the relationship between arm 40 and connector housing 30 with shaft 34 that is rotatably received within cavity 24 of charger body 20.

Figure 4:
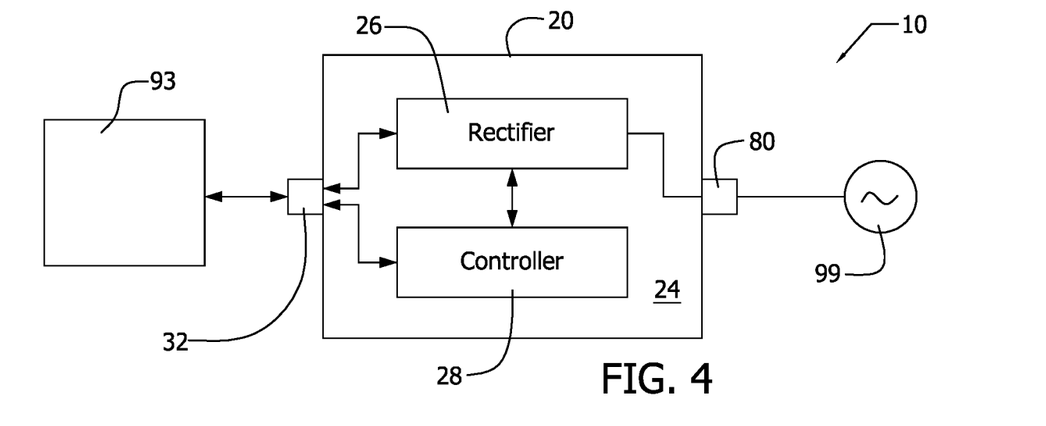
FIG. 4 illustrates by schematic diagram portions of the charger apparatus of FIG. 1A.

As illustrated in FIG. 4, charger body 20 defines cavity 24 within which rectifier 26 and controller 28 are disposed. Rectifier 26 may be in electrical communication with AC source 99 in the form of socket 91 via prongs 80, and rectifier 26 may be in electrical communication with mobile device 93 via connector 32 to flow electricity from AC source 99 onto mobile device 93. In this implementation, rectifier 26 alters the electrical current from AC source 99 to direct current (DC) of suitable amperage and voltage for mobile device 93. Controller 28 may communicate with rectifier 26 and with mobile device 93, for example, to regulate the flow of electrical current onto mobile device 93, in this implementation. Rectifier 26, for example, may variously employ pulse-width modulation (PWM), half-wave rectification, full-wave rectification and so forth as required by mobile device 93. Rectifier 26 may variously include a transformer, filter(s), surge protector, and so forth. Controller 28 may variously include a microprocessor, logical circuitry, driver, memory, and so forth, and various combinations of data and power may be communicated between rectifier 26, controller 28, and mobile device 93 as indicated by arrowheads in FIG. 4, as would be readily recognized by those of ordinary skill in the art upon study of this disclosure. Various electrical pathways, connectors, circuit board(s) that may include rectifier 26 and/or controller 28, and other electrical components may be disposed within cavity 24, within connector housing 30, about connector 32, or otherwise about charger apparatus 10, in various implementations, as would be readily recognized by those of ordinary skill in the art upon study of this disclosure.

In operation, charger apparatus 10 may be in stowed charger position 11 with connector housing 30 in stowed position 31, arm 40 in stowed arm position 41, and prongs 80 in stowed prong position 81, as depicted, for example, in FIG. 2A. For example, in order to position charger apparatus 10 from stowed charger position 11 into deployed charger position 13 as depicted, for example, in FIG. 2B, arm 40 is positioned from stowed arm position 41 into deployed arm position 43, as illustrated in FIG. 3B. With arm 40 in deployed arm position 43, shaft 34 is rotatable, and connector housing 30 is pivoted from stowed position 31 into deployed position 33, as illustrated in FIGS. 3C, 3D, 3E. With connector housing 30 in deployed position, notch 51 at shaft end 35 of shaft 34 is oriented to lock arm 40 in deployed arm position 43, as illustrated in FIGS. 3C, 3D. Also, prongs 80 are pivoted from stowed prong position 81 into deployed prong position 83 during the positioning of charger apparatus 10 from stowed charger position 11 into deployed charger position 13. Prongs 80 may be releasably lockably retained in deployed prong position 83, and/or in stowed prong position 81, in various implementations.

With connector housing 30 in deployed position 33, arm 40 in deployed arm position 43, and prongs 80 in deployed prong position 83, the prongs 80 may be inserted into socket 91 and mobile device 93 may be engaged with connector 32 to deliver power from socket 91 onto mobile device 93. Arm 40 biases against mobile device 93 to support mobile device 93, and arm 40 may support mobile device 93 in near upright position 17.

The user may grip connector housing 30 including connector 32, arm 40, and prongs 80 in order to position connector housing 30 between stowed position 31 and deployed position 33, position arm 40 between stowed arm position 41 and deployed arm position 43, and position prongs 80 between stowed prong position 81 and deployed prong position 83, respectively. Various grippable surfaces and accesses may be provided about connector housing 30, arm 40, prongs 80, and/or charger body 20 that allow the user to position connector housing 30 between stowed position 31 and deployed position 33, arm 40 between stowed arm position 41 and deployed arm position 43, and prongs 80 between stowed prong position 81 and deployed prong position 83, respectively.

Figure 5A:
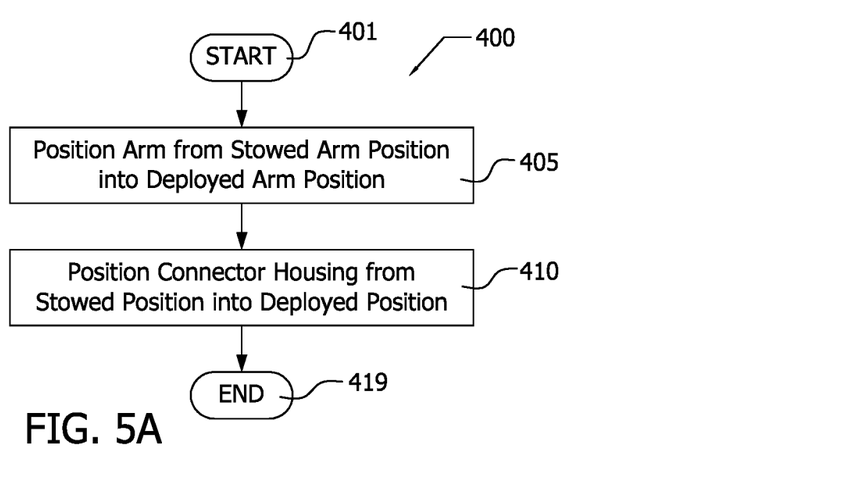
FIG. 5A illustrates by process flow chart an exemplary method of operation of the charger apparatus of FIG. 1A; and, FIG. 5B illustrates by process flow chart another exemplary method of operation of the charger apparatus of FIG. 1A.

An exemplary method of operation 400 of charger apparatus 10 is illustrated in FIG. 5A. Method of operation 400 is entered at step 401 with charger apparatus 10 in stowed charger position 11. Arm 40 is positioned from stowed arm position 41 into deployed arm position 43 at step 405. At step 410, connector housing 30 is positioned from stowed position 31 into deployed position 33. Prongs 80 may be rotated from stowed prong position 81 into deployed prong position 83 at any point during method of operation 400. Method of operation then terminates at step 419 with charger apparatus 10 in deployed charger position 13.

In order to return charger apparatus 10 from deployed charger position 13 to stowed charger position 11, connector 32 is removed from engagement with mobile device 93 and prongs 80 are removed from socket 91. Connector housing 30 is then pivoted from deployed position 33 into stowed position 31 and then arm 40 is positioned from deployed arm position 43 into stowed arm position 41. Prongs 80 are pivoted from deployed prong position 83 into stowed prong position 81.

Figure 5B:
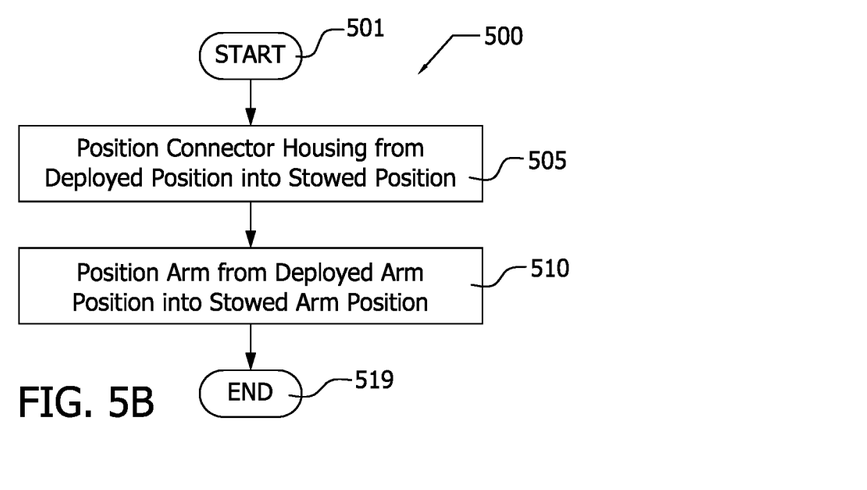

An exemplary method of operation 500 of charger apparatus 10 is illustrated in FIG. 5B. Method of operation 500 is entered at step 501 with charger apparatus 10 in deployed charger position 13. At step 505, connector housing 30 is positioned from deployed position 33 into stowed position 31. Arm 40 is positioned from deployed arm position 43 into stowed arm position 41 at step 510. Prongs 80 may be rotated from deployed prong position 83 into stowed prong position 81 at any point during method of operation 500. Method of operation then terminates at step 519 with charger apparatus 10 in stowed charger position 11.

As is generally illustrated in the Figures, arm 40 in stowed arm position 41 is situated over connector housing 30 in stowed position 31, so that connector 32 of connector housing 30 cannot engage mobile device 93. Arm 40 must be in deployed arm position 43 in order for connector housing 30 to be positioned in deployed position 33 that allows connector 32 to be engaged with mobile device 93, in the illustrative implementation presented herein. Arm 40 cannot be positioned from deployed arm position 43 into stowed arm position 41 without connector housing 30 having been placed in stowed position 31, in the illustrative implementation presented herein. In this way, arm 40 must be in deployed arm position 43 in order to use charger apparatus 10 with mobile device 93, in the illustrative implementation presented herein.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. An apparatus for charging a mobile device, comprising:
    a) a charger body;
    b) a connector pivotally connected to the charger body at a first pivot location, the connector operable to pivot between a connector stowed position and a connector deployed position, the connector operable to mechanically engage the mobile device for electrical communication with the mobile device when the connector is in the connector deployed position;
    c) a support arm pivotally connected to the charger body at a second pivot location, the support arm operable to pivot independently of the connector, the support arm operable to pivot between a support arm stowed position and a support arm deployed position, the support arm operable to support the mobile device when the support arm is in the support arm deployed position;
    d) wherein the support arm is operable to pivot between the support arm stowed position and the support arm deployed position only when the connector is in the connector stowed position, wherein the support arm is prevented from pivoting from the support arm deployed position to the support arm stowed position when the connector is in the connector deployed position; and
    e) wherein the connector is operable to pivot between the connector stowed position and the connector deployed position only when the support arm is in the support arm deployed position, wherein the connector is prevented from pivoting from the connector stowed position to the connector deployed position when the support arm is in the support arm stowed position.

2. An apparatus according to claim 1, further comprising an electrical member pivotally connected to the charger body at a third pivot location, the electrical member operable to pivot independently of the connector and the support arm, the electrical member operable to pivot between an electrical member stowed position and an electrical member deployed position, the electrical member operable to mechanically engage a source of electrical power to allow power to flow from the source of electrical power through the connector and into the mobile device when the electrical member is in the electrical member deployed position.

3. An apparatus according to claim 2, wherein the electrical member is a pair of prongs, the prongs operable to pivot between a prong stowed position and prong deployed position, the prongs receivable within slots formed in the charger body when in the prong stowed position, the prongs operable to insertably engage an electrical socket when in the prong deployed position.

4. An apparatus according to claim 1, wherein the support arm is positioned over the connector to prevent the connector from pivoting from the connector stowed position to the connector deployed position when the support arm is in the support arm stowed position and the connector is in the connector stowed position.

5. An apparatus for charging a mobile device, comprising:
    a) a charger body;
    b) a connector pivotally connected to the charger body at a first pivot location, the connector operable to pivot between a connector stowed position and a connector deployed position, the connector operable to mechanically engage the mobile device for electrical communication with the mobile device when the connector is in the connector deployed position;
c) a support arm pivotally connected to the charger body at a second pivot location, the support arm operable to pivot independently of the connector, the support arm operable to pivot between a support arm stowed position and a support arm deployed position, the support arm operable to support the mobile device when the support arm is in the support arm deployed position;
d) an electrical member pivotally connected to the charger body at a third pivot location, the electrical member operable to pivot independently of the connector and the support arm, the electrical member operable to pivot between an electrical member stowed position and an electrical member deployed position, the electrical member operable to mechanically engage a source of electrical power to allow power to flow from the source of electrical power through the connector and into the mobile device when the electrical member is in the electrical member deployed position;
e) wherein the support arm is operable to pivot between the support arm stowed position and the support arm deployed position only when the connector is in the connector stowed position, wherein the support arm is prevented from pivoting from the support arm deployed position to the support arm stowed position when the connector is in the connector deployed position; and
f) wherein the connector is operable to pivot between the connector stowed position and the connector deployed position only when the support arm is in the support arm deployed position, wherein the connector is prevented from pivoting from the connector stowed position to the connector deployed position when the support arm is in the support arm stowed position, wherein the support arm is positioned over the connector to prevent the connector from pivoting from the connector stowed position to the connector deployed position when the support arm is in the support arm stowed position and the connector is in the connector stowed position.

6. An apparatus according to claim 5, wherein the electrical member is a pair of prongs, the prongs operable to pivot between a prong stowed position and prong deployed position, the prongs receivable within slots formed in the charger body when in the prong stowed position, the prongs operable to insertably engage an electrical socket when in the prong deployed position.

7. An apparatus for charging a mobile device, comprising:
a) a charger body;
b) a shaft rotatably mounted to the charger body, the shaft having a shaft end with a notch formed therein, the shaft operable to rotate between a shaft first position and a shaft second position;
c) a connector connected to the shaft, the connector operable to pivot between a connector stowed position and a connector deployed position as the shaft rotates between the shaft first position and the shaft second position, the connector operable to mechanically engage the mobile device for electrical communication with the mobile device when the connector is in the connector deployed position;
d) a support arm pivotally connected to the charger body, the support arm having a support arm end, the support arm operable to pivot between a support arm stowed position and a support arm deployed position, the support arm operable to pivot independently of the connector, the support arm operable to support the mobile device when the support arm is in the support arm deployed position;
e) wherein the support arm is operable to pivot between the support arm stowed position and the support arm deployed position only when the connector is in the connector stowed position, wherein the support arm end is operable to pivot into and out of the notch in the shaft end when the connector is in the connector stowed position as the support arm pivots between the support arm stowed position and the support arm deployed position;
f) wherein the support arm is prevented from pivoting from the support arm deployed position to the support arm stowed position when the connector is in the connector deployed position, wherein the shaft end is operable to engage the support arm end and thereby prevent pivoting of the support arm when the support arm is in the support aim deployed position and the connector is in the connector deployed position;
g) wherein the connector is operable to pivot between the connector stowed position and the connector deployed position only when the support arm is in the support arm deployed position, wherein the shall is operable to rotate freely between the shaft first position and the shaft second position when the support arm is in the support arm deployed position; and
h) wherein the connector is prevented from pivoting from the connector stowed position to the connector deployed position when the support arm is in the support arm stowed position, wherein the support arm end is operable to engage the shaft end and thereby prevent rotation of the shaft when the support arm is in the support arm stowed position and the connector is in the connector stowed position.

8. An apparatus according to claim 7, further comprising an electrical member pivotally connected to the charger body, the electrical member operable to pivot independently of the connector and the support arm, the electrical member operable to pivot between an electrical member stowed position and an electrical member deployed position, the electrical member operable to mechanically engage a source of electrical power to allow power to flow from the source of electrical power through the connector and into the mobile device when the electrical member is in the electrical member deployed position.

9. An apparatus according to claim 8, wherein the electrical member is a pair of prongs, the prongs operable to pivot between a prong stowed position and prong deployed position, the prongs receivable within slots formed in the charger body when in the prong stowed position, the prongs operable to insertably engage an electrical socket when in the prong deployed position.

10. An apparatus according to claim 7, Wherein the support arm is positioned over the connector to prevent the connector from pivoting from the connector stowed position to the connector deployed position when the support arm is in the support arm stowed position and the connector is in the connector stowed position.

* * * * *

UNITED STATES PATENT AND TRADEMARK OFFICE
CERTIFICATE OF CORRECTION

| | | |
|---|---|---|
| PATENT NO. | : 10,601,237 B1 | Page 1 of 1 |
| APPLICATION NO. | : 15/870032 | |
| DATED | : March 24, 2020 | |
| INVENTOR(S) | : Allegra Shum, Alexander Andon and Dan Soha | |

It is certified that error appears in the above-identified patent and that said Letters Patent is hereby corrected as shown below:

On the Title Page

Item (73) the Assignee should be "Chargerito, LLC"

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*